United States Patent [19]

Burmeister

[11] 3,784,891

[45] Jan. 8, 1974

[54] MULTIAXES TWO CYCLE GIMBAL ERROR CORRECTOR

[75] Inventor: William W. Burmeister, Phoenix, Ariz.

[73] Assignee: Sperry Rand Corporation, New York, N.Y.

[22] Filed: Jan. 25, 1971

[21] Appl. No.: 109,422

[52] U.S. Cl..................... 318/633, 318/648, 244/77
[51] Int. Cl. ........................................... G05b 11/01
[58] Field of Search.................... 318/655, 633, 632, 318/648; 244/77

[56] References Cited
UNITED STATES PATENTS

| | | | |
|---|---|---|---|
| 3,571,687 | 3/1971 | Larwin............................ | 318/633 X |
| 3,234,444 | 2/1966 | Burmeister et al. ................ | 318/633 |
| 3,031,766 | 5/1962 | Schulte........................... | 318/632 X |
| 3,196,332 | 7/1965 | Branom et al. ..................... | 318/633 |
| 2,866,934 | 12/1958 | Whitehead........................ | 318/655 X |
| 3,316,532 | 4/1967 | Schaffer.......................... | 318/632 X |
| 3,548,284 | 12/1970 | Espen ............................ | 318/632 X |
| 2,753,498 | 7/1956 | Gray .............................. | 318/633 |
| 2,814,767 | 11/1957 | Gray .............................. | 318/633 |
| 3,259,822 | 7/1966 | Burmeister et al. ................ | 318/633 |

*Primary Examiner*—T. E. Lynch
*Attorney*—S. C. Yeaton

[57] ABSTRACT

Apparatus for compensating for gimbal error occurring in a directional gyroscopic data transmission system under simultaneous conditions of pitch and roll attitude of the aircraft by the provision of an electrical circuit connected in a three-branch line coupling the gyro transmitter to an electrical receiver at which the output data is produced. The compensating circuit includes a pair of amplifiers connected across one branch of the three-branch line. The signals provided at the outputs of the respective amplifiers are modified in accordance with discrete functions of aircraft pitch and roll attitude, the one amplifier output being connected into the one branch of the line across which the amplifiers are connected while the other amplifier output is coupled into the two additional branches of the line thereby providing the receiver with electrical heading signals compensated for the gimbal error.

23 Claims, 5 Drawing Figures

INVENTOR
WILLIAM W. BURMEISTER
BY
ATTORNEY

MULTIAXES TWO CYCLE GIMBAL ERROR CORRECTOR

BACKGROUND OF THE INVENTION

1. Field of the Invention

The present invention relates to gyroscopic data transmission systems and more particularly to compensation means associated therewith for correcting the output data of the system for errors due to the gimbal configuration and attitude of the gyro. Although the invention has general utility for correcting gimbal errors, it is particularly useful in aircraft gyromagnetic compass systems and accordingly will be disclosed with reference to such systems.

2. Description of the Prior Art

An aircraft gyromagnetic compass system typically comprises a directional gyro which has its spin axis slaved to a fixed heading reference such as magnetic North, for instance by a flux valve or other equivalently operating apparatus. The gyro spin axis is customarily aligned to the magnetic North reference and the aircraft heading is then indicated by the angular deviation between the aircraft longitudinal axis and the direction of the magnetic North reference. A synchro transmitter coupled to the gyro supplies heading data by way of a multicircuit line to a synchro receiver or control transformer, which in turn operates a servo to align a heading indicator with the slaved gyro spin axis.

As a consequence of the gimbal configuration incorporated in the gyro, the heading indication provided thereby deviates from the actual or true heading when the aircraft rolls or pitches about its respective longitudinal and transverse axes. The error occurring under such conditions is known as gimbal error and is characterized by a two cycle variation for each 360° of heading. The gimbal error is at a minimum when the spin axis of the gyro is aligned with either the longitudinal (roll) or transverse (pitch) axis of the craft since under these conditions the craft roll and pitch attitude does not exert a disturbing influence on the gimbal. Maximum gimbal error, on the other hand, occurs when the gyro spin axis is at an angle of approximately 45° relative to the pitch and roll axes of the craft and is therefore produced at four discrete headings as the craft swings through 360° in azimuth. A more complete description of the nature of this two-cycle error is provided in U.S. Pat. No. 2,770,745 entitled, "Data Transmission System and Corrector Therefor," invented by Depp et al and assigned to the assignee of the present invention.

Heretofore compensation of the two-cycle gimbal error has been achieved in various ways, for instance by means of pitch and roll stabilization of the directional gyro, but this necessitates unduly complex mechanization and is not universally adaptable to existing gyroscopic data transmission systems. Other innovations for dealing with gimbal error have eliminated the need for pitch and roll stabilization by incorporating means such as variable impedances or variable gain amplifiers in the multicircuit transmission line coupling the gyro transmitter to the indicator receiver to introduce electrical compensation for the error caused by the gimbal configuration. Prior art systems of the electrical compensation type are more fully described in U.S. Pat. No. 3,196,332 and 3,234,444 issued to Branom et al. and Burmeister et al, respectively, and assigned to the assignee of the present invention. These systems are restricted, however, to single axis compensation, that is they incorporate means for correcting the gimbal heading error for either pitching or rolling motion of the craft but not for correcting both of these motions which may occur either individually or simultaneously. A need for such correction arises in present day commercial transport aircraft which typically climb out at quite steep pitch attitudes during takeoff and, frequently before levelling off, execute large bank angle turns. Such maneuvers cause large gimbal errors in a compass indication derived from an unstabilized directional gyro and if left uncorrected would result in a correspondingly large heading error at a central point of the flight profile.

It is therefore a principal object of the present invention to provide a gimbal error correction of the variable voltage type wherein data is corrected in the course of being transmitted from the gyro transmitter to the compass indicator receiver in such a manner as to compensate for errors associated with both roll and pitch motion of the aircraft. A system of this nature is considerably less complicated and less expensive than a stabilized platform system and has the additional advantage of compatibility with existing non-stabilized gyroscopic compass systems.

SUMMARY OF THE INVENTION

In a preferred embodiment of the present invention utilized in a compass system, a Y-configured resistor network is connected across the respective leads of a synchro transmitter affixed to a directional gyroscope. A pair of amplifiers are connected to one of the resistors of the Y network having a voltage thereacross representative of the voltage at the corresponding leg of the synchro transmitter. The gain of one of these amplifiers is regulated by a signal function of the form $3/2[(\cos\phi/\cos\theta)-1)]$ where $\theta$ and $\phi$ represent the pitch and roll attitude of the directional gyro and the aircraft in which the gyro is installed. The output of this amplifier is applied to the related synchro receiver leg.

The gain of the other amplifier is controlled by a signal function of the form $$\sqrt{3/2} \tan\theta \sin\phi$$

and its output is coupled through respective summing amplifiers into the other two legs of the receiver along with the signals produced in the corresponding legs of the transmitter.

In another embodiment of the invention, the output signal from the gain controlled amplifiers, which again are coupled across one leg of a Y-configured resistor network, are transformer coupled into the lines connecting the respective legs of the synchro transmitter and receiver.

In both of the foregoing embodiments, the somewhat complex trigonometric functions indicated above may be approximated, as will be explained subsequently, by appropriate algebraic functions which are more easily implemented without undue degradation of the heading accuracy.

DESCRIPTION OF THE PREFERRED EMBODIMENTS

Figure 1:
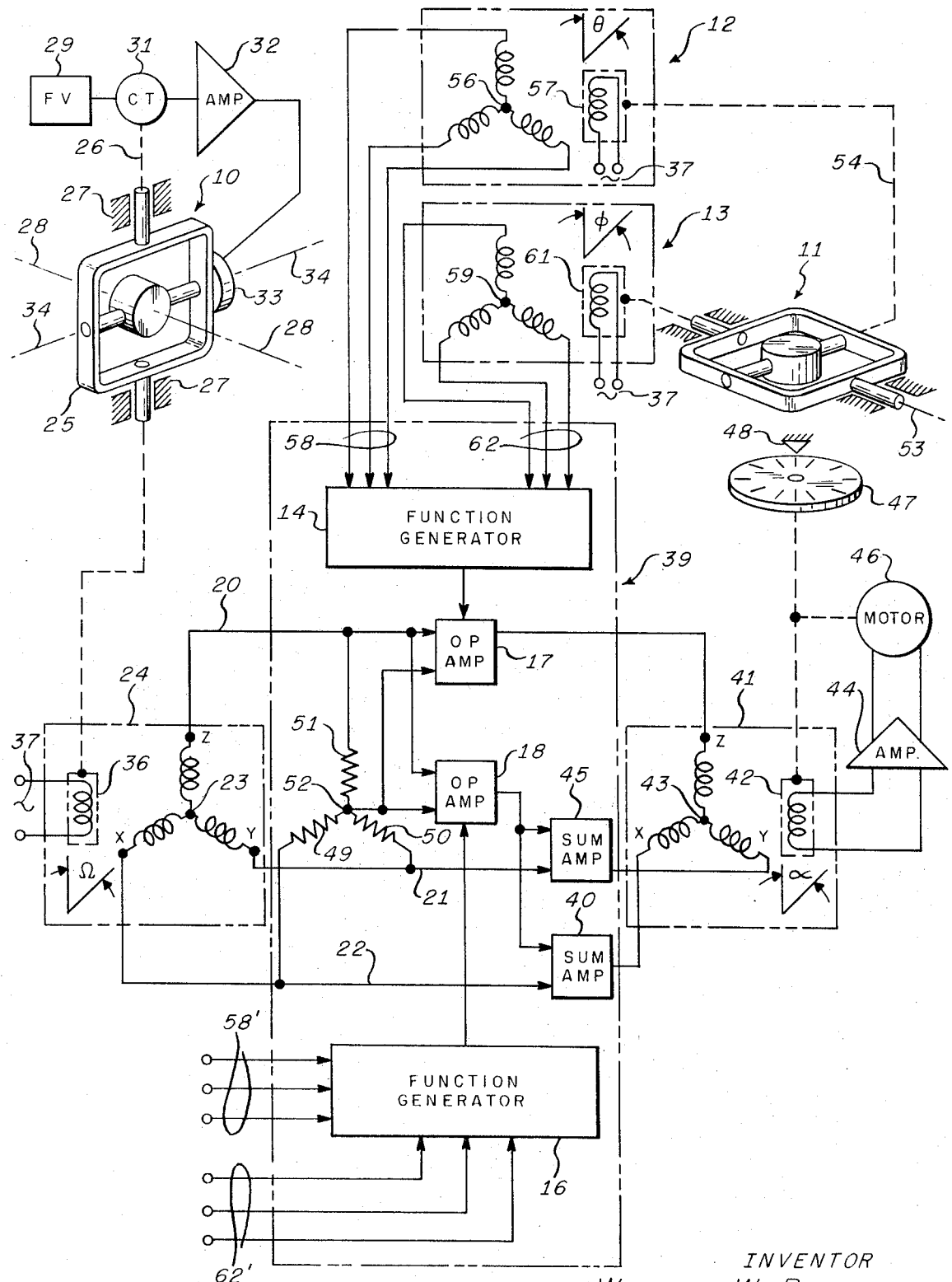
FIG. 1 is a schematic diagram showing one form of the present invention.

Referring to the embodiment of FIG. 1, pitch and roll compensation for the gimbal error of directional gyro 10 is provided by vertical gyro 11 which has its pitch and roll synchro pickoffs 12 and 13 connected to function generators 14 and 16. The function generators, in turn, are coupled to operational amplifiers 17 and 18 to modify the heading signals provided on leads 20, 21 and 22, connected to the stator 23 of synchro transmitter 24, in a manner to compensate for the gimbal error.

Before proceeding with a discussion of the error compensating apparatus, consider momentarily the arrangement of the directional gyro in a compass indicator system. As indicated in the drawing, the directional gyro is arranged with respect to the craft in which it is mounted with its gimbal ring 25 oriented for rotation about a normally vertical axis 26 established by the cooperative relation of the gimbal trunnions and bearing housing 27 which moves with the craft as it yaws or turns in aximuth through an angle of 360°. The gyro is initially aligned so that a null appears across leads 21 and 22 when the gyro spin axis 28 is aligned parallel to the longitudinal axis of the aircraft. Orientation of the spin axis is maintained fixed in space by means of flux valve 29 which responds to the earth's magnetic field. The flux valve signals are applied through control transformer 31 and slaving amplifier 32 to torquer motor 33 which exerts a rotational force about axis 34 oriented normal to axes 26 and 28 to precess the gyro about axis 26 and thereby maintain the alignment of the gyro rotor spin axis with the horizontal component of the earth's magnetic field.

The rotor 36 of synchro transmitter 24 is mechanically connected to rotate with the directional gyro about axis 26. Electrical excitation is applied to the rotor from an alternating current source 37. In the course of initially aligning the compass system, the sychro transmitter is mounted on the directional gyro so that a null exists across stator legs X and Y when the spin axis of the gyro is aligned with the longitudinal axis of the craft, the gyro sign axis thereafter, as previously mentioned is slaved to magnetic North by the flux valve. Then as the craft turns, the synchro stator, which is fixedly mounted to the craft, rotates relative to the synchro rotor producing a resultant voltage vector in the stator indicative of the heading Ω of the craft relative to the magnetic North reference.

As previously explained, the heading signal normally exhibits a two-cycle error as the craft rotates through 360° of heading. The compensator 39 coupled into the leads 20, 21 and 22 intermediate the synchro transmitter and receiver 41, operates to eliminate this error so that the indicated heading α represented by the orientation of the receiver rotor 42 relative to its stator 42 is accurately representative of the true aircraft heading.

The heading is indicated to the pilot of the craft by means of amplifier 44 which receives an input signal from the recevier rotor and in turn provides an output signal to motor 46 to slave the rotor of the synchro receiver to a null position and simultaneously drive the compass card 47 relative to indicator 48 affixed to the craft.

Figure 3A:
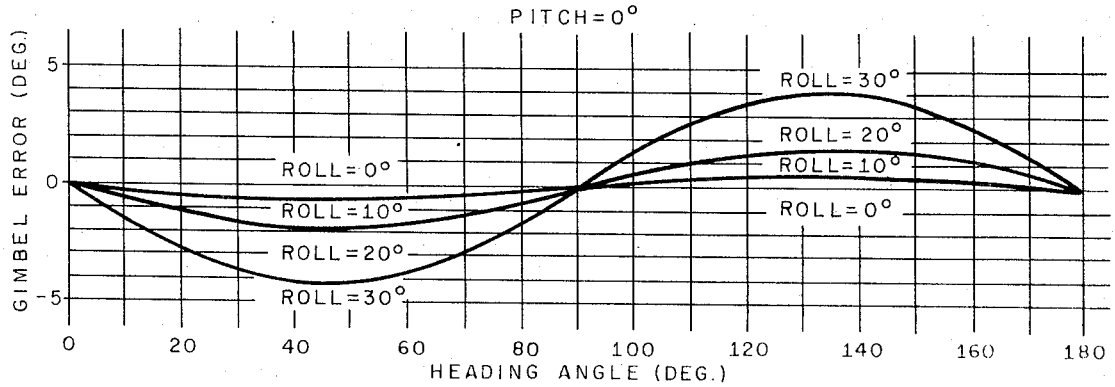
FIGS. 3a, 3b and 3c are graphs illustrating the gimbal error in degrees of the transmitter signal for various conditions of aircraft pitch and roll attitude through a range of 180° of craft heading.
Figure 3B:
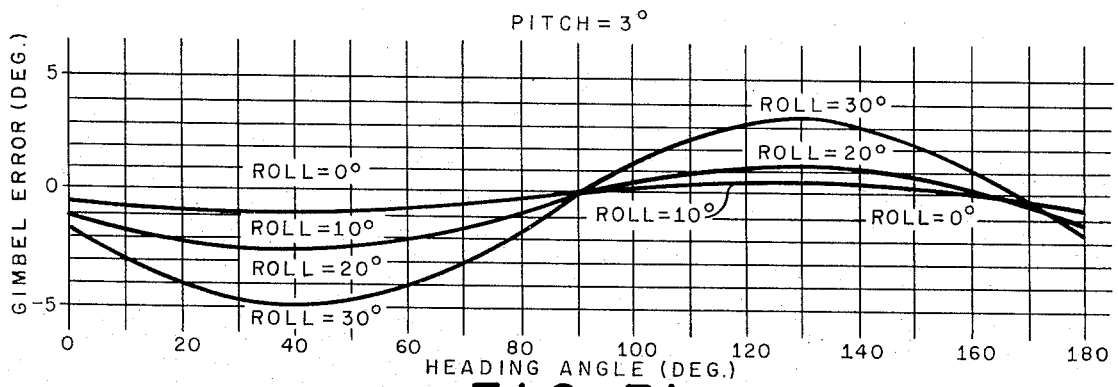
Figure 3C:
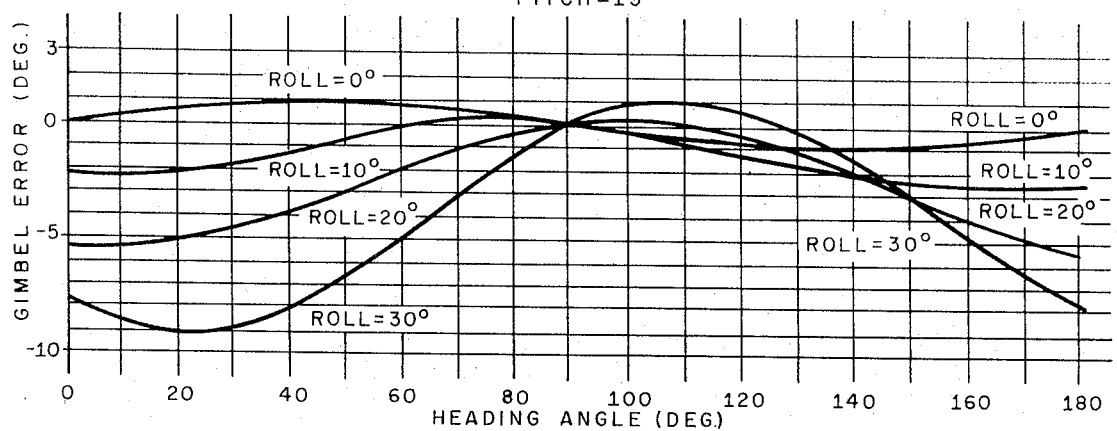

The nature of the two-cycle gimbal error is depicted in FIGS. 3a, 3b and 3c where gimbal error in degrees is presented as a function of heading angle in degrees for various conditions of pitch and roll attitude. The error is repetitive for the next 180° of heading and therefore is not shown in the drawings; but in any event, it will be noted that for the three illustrated cases the error does indeed go through a two-cycle variation for each 360° of heading rotation. More specifically, at a zero pitch angle condition (FIG. 3a), it is seen that the maximum error occurs at angles of approximately 45° between the directional gyro spin axis and the longitudinal axis of the craft and, as seen, the error increases with increasing roll angle up to a maximum error slightly less than 5 degrees at a roll angle of 30°. At a pitch angle of 3° (FIG. 3b), the maximum error is observed to occur at angular deviations of approximately 40° between the directional gyro spin axis and the craft longitudinal axis; and again the error increases with roll angle and is a maximum of about 5° at a roll angle of 30°. In the case of a larger pitch angle, namely 15° as indicated in FIG. 3c, the maximum gimbal error still increases with increasing roll angle, the maximum value being slightly less than 10° at a roll angle of 30°. In this case, however, the maximum gimbal angle occurs at different heading angles for various roll conditions and the curves are seen to be unsymmetrical with respect to the zero error axis.

Returning to the apparatus of FIG. 1, the compensator 39 comprises a Y-configured resistor network including resistors 49, 50, and 51 connected across the X, Y and Z legs (branches), respectively, of the synchro transmitter stator 23 and operational amplifiers 17 and 18 connected across resistor 51, which as indicated, is coupled between lead 20 and the common terminal 52. Operational amplifier 17 also has a signal applied to its input from function generator 14 while operational amplifier 18 receives an additional signal from function generator 16 so that the output signals of the operational amplifiers are modified in accordance with the nature of the respective function generator signals applied thereto. The output signal of operational amplifier 17, in turn, is applied to the Z leg of the synchro receiver while the output signal of operational amplifier 18 is applied to the input terminals of summing amplifiers 40 and 45 wherein it combines respectively with the signals on leads 22 and 21. The input stages of the summing amplifiers operate in a manner to invert the phase of the operational amplifier output signal 18 in the course of summing with the signal on lead 21 as compared to the phase of the operational amplifier 18 output summed with the signal on lead 22. Finally, the outputs of summing amplifiers 40 and 45 are connected to the X and Y legs respectively of synchro receiver 41. It should be understood that the Y connected resistor network is included as a part of the compensator only for the purpose of obtaining a common terminal representative of the junction point of the stator legs. Thus, if the synchro transmitter was constructed with a terminal connecting to the junction point of the stator legs, amplifiers 17 and 18 could be connected directly thereto and the Y resistor network eliminated.

As previously mentioned, function generators 14 and 16 must generate functions representable mathematically as $(3/2)[(\cos\theta/\cos\phi)-1)]$ and $\sqrt{3/2}\tan\phi\sin\theta$ respectively, for varying conditions of pitch and roll attitude of the craft in order to achieve the desired compensation. These functions can be derived by appropriately manipulating and combining the standard gimbal error equation, given as equation (1) in the aforementioned Branom et al. patent, with additional equations which represent the current and voltage conditions in the multicircuit line and relate the receiver angle $\alpha$ to the multicircuit line currents. By conventional circuit analysis it can be shown that the currents in the Z, Y and X legs (lines 20, 21 and 22, respectively) are $$I_Z = 1/(3Z_t)(-2E_Z+E_X+E_Y) \quad (1a)$$

$$I_Y = 1/(3Z_t)(E_Z+E_X-2E_Y) \quad (1b)$$

$$I_X = 1/(3Z_t)(E_Z-2E_X+E_Y) \quad (1c)$$

where $Z_t$ is the sum of the impedances of the related transmitter and receiver legs for the assumption that all such impedances are balanced so as to be of equal value, and $\alpha$ and $\Omega$ are the receiver and transmitter angles respectively. Likewise, the voltage on each of the three lines measured relative to the common junction point of the transmitter stator winding can be determined from conventional circuit analysis to be $$E_Z = E\cos\Omega + XE\cos\Omega = (E\cos\Omega)(1+X) \quad (2a)$$
$$E_Y = E\cos(\Omega - 120) - YE\cos\Omega \quad (2b)$$
$$E_X = E\cos(\Omega + 120) + YE\cos\Omega \quad (2c)$$

where $E$ is the amplitude of the voltage across each winding of the transmitter stator and X and Y represent respective gain or amplitude modifying terms. More specifically, X represents a modification of the transmitter Z leg voltage coupled to the Z leg of the receiver and Y represents a modification of the transmitter Z leg voltage coupled into the X and Y legs of the receiver. In addition, the line currents $I_Z$, $I_Y$ and $I_X$ and the receiver angle $\alpha$ can be shown to be related as follows:

$$\tan\alpha = \sqrt{3}[I_Y - I_X/2I_Z - (I_X+I_Y)] \quad (3)$$

By substituting equations 2a, b, c into equations 1a, b, c, there results $$I_Z = (-E/3Z_t)(\cos\Omega)(3+2X) \quad (4a)$$
$$I_Y = E/(3Z_t)[(\cos\Omega)(3/2+X)+3Y\cos\Omega-(3\sqrt{3}/2)\sin\Omega] \quad (4b)$$
$$I_X = (E/3Z_t)[(\cos\Omega)(3/2+X)-3Y\cos\Omega+(3\sqrt{3}/2)\sin\Omega] \quad (4c)$$

Substituting equations 4a, b, c into equation (3) yields $$\tan\alpha = 3/(2X+3)[\tan\Omega - (2/\sqrt{3})Y] \quad (5)$$

At this point the standard gimbal error equation is introduced. For an assmption that the average inner gimbal tilt angle is equal to zero, this equation is $$\tan G_0 = [(\cos\phi/\cos\theta)\tan\gamma]-(\tan\theta\sin\phi) \quad (6)$$

where $G_0$ is the gyro spin axis heading or heading transmitted by the gyro and $\gamma$ equals the actual aircraft heading. For the condition where the transmitter Z leg is initially aligned with the gyro spin axis as hereinbefore explained, $G_0$ is equal to $\Omega$ so equation (6) may be written as $$\tan\Omega = (\cos\phi/\cos\theta\tan\gamma)-(\tan\theta\sin\phi) \quad (7)$$

Substituting equation (7) into equation (5) provides $$\tan\alpha = 3/(2X+3)[(\cos\phi/\cos\theta)\tan\gamma-\tan\theta\sin\phi-(2/\sqrt{3})Y] \quad (8)$$

The desired result is that the receiver angle $\alpha$ be equal to the actual heading angle $\gamma$. This is achieved when $\tan\alpha = \tan\gamma$, which results from equation (8) when $$(2/\sqrt{3})Y = -\tan\theta\sin\phi \text{ or}$$
$$Y = -(\sqrt{3}/2)\tan\theta\sin\phi, \text{ and}$$
$$(2X+3/3) = (\cos\phi/\cos\theta) \text{ or}$$
$$X = (3/2)(\cos\phi/\cos\theta - 1).$$

Figure 2:
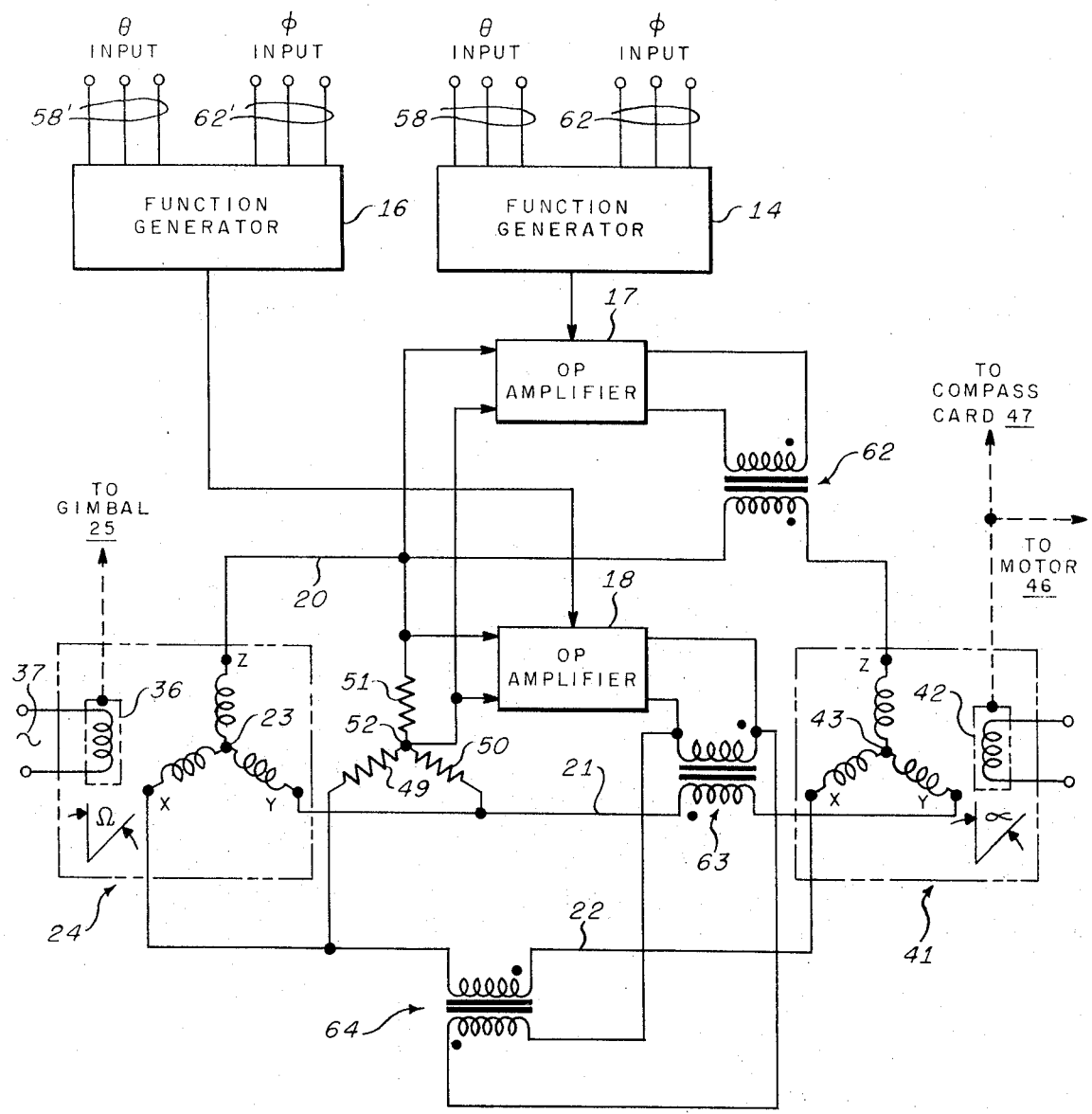
FIG. 2 is a schematic diagram of an alternative form of the present invention.

It is thus seen that in order to obtain the desired gimbal error compensation, the signal derived from the Z leg of the transmitter 24 must be modified by a function $3/2(\cos\phi/\cos\theta-1)$ for application to the Z leg of the receiver, and separately modified by an additional function $$(\sqrt{3}/2)\tan\theta\sin\phi$$

for application to the X and Y legs of the receiver. Generation of these functions is obtained by applying to function generators 14 and 16 pitch and roll signals derived from vertical gyro 12 which is mounted with its rotor spin axis vertically oriented to sense rotational motions about the craft longitudinal and transverse axes 53 and 54. A signal representative of the pitch attitude $\theta$ is provided from the pitch pickoff synchro 12 by virtue of relative rotation between its stator 56 and rotor 57 which are connected respectively to the craft and the vertical gyro pitch axis 54, the pitch attitude signal being coupled via leads 58 and 58' to function generators 14 and 16. Likewise, a signal representative of the roll attitude $\phi$ is provided from the roll pickoff synchro 13 by virtue of relative rotation between its stator 59 and rotor 61 which connect respectively to the craft and the vertical gyro roll axis 53, the roll attitude signal being applied to the function generators via leads 62 and 62'. Rotor excitation for the pitch and roll pickoffs is obtained from alternating current source 37 used to energize the rotor of the gyro synchro transmitter. The functions may be implemented by conventional techniques well known to those skilled in the art. For instance, the three-wire pitch and roll attitude signals obtained from the vertical gyro pickoff synchros can be readily converted to two-wire or single-wire sine and cosine signals referenced to ground by means of a three-phase, to two-phase converter of the type shown in FIG. 12.19 at Page 444 of the Waveforms volume of the Radiation Laboratory Series published by McGraw-Hill in 1949 and referred to in the aforementioned Branom et al. patent at column 4, lines 10–16. In other words, sine $\phi$ and cosine $\theta$ signals can be obtained from the three-wire roll attitude signal provided by the roll pickoff synchro 13 while sine $\theta$ and cos $\theta$ signals can be obtained from the three-wire signals provided by the pitch pickoff synchro 12. From these signals, the function $3/2(\cos\phi/\cos\theta-1)$ can be readily generated by using an analog division circuit as shown in FIG. 2.36(a) on page 74 of the book Analog Methods in Computation and Simulation written by W. W. Soroka and published by McGraw-Hill in 1954, to obtain $\cos \phi/\cos \theta$ and thereafter subtracting unity from the divider output by means of a conventional operational amplifier having associated input and feedback resistors selected to provide the desired gain of (3/2). Likewise, the function $(\sqrt{3}/2) \tan \theta \sin \theta$ can be obtained by dividing $\sin \theta$ by $\cos \theta$ to obtain the tangent and then using any convenient multiplier with appropriate gain to obtain the sine-tangent product. A typical multiplier is shown in FIG. 2.19 on page 57 of the above-mentioned Soroka book.

The embodiment of FIG. 2 is the same as that of FIG. 1 in all respects except for the manner of coupling the error correction signals into the line connecting the gyro transmitter and indicator receiver. Accordingly, only that part of the system necessary to indicate the distinguishing features is shown in the drawings. This embodiment has particular applicability when the gyro transmitter and indicator receiver are part of an integrated system whereas the embodiment of FIG. 1 is generally required to be used where the synchro receiver impedances are determined by pre-existing hardware and cannot be controlled in accordance with system design requirements. As in the case of the FIG. 1 embodiment, a Y-configured resistor network is connected across the stator of the gyro synchro transmitter and signals are derived from the voltage across resistor 51 for application to operational amplifier 17 and 18 which again are regulated by function generators 14 and 16 respectively. To connect the output signals of the operational amplifier back into the multicricuit line, double ended outputs are provided at each amplifier. Amplifier 17 connects to the primary of transmitter 62 which has its secondary coupled into lead 20 connecting the Z legs of the synchro transmitter and receiver. Amplifier 18 connects to the primaries of transformers 63 and 64, the secondary windings of which are coupled respectively into leads 21 and 22 thereby combining the amplifier 18 output signal with the signals provided at the X and Y legs of the synchro transmitter for application to the corresponding legs of the synchro receiver. It will be noted that the windings of transformers 63 and 64 are inverted relative to one another so that the polarities of the signals coupled into the X and Y legs are of opposite phase as is required to achieve the desired compensation.

In both of the aforedescribed embodiments, the exact solutions of $3/2 [(\cos \phi/\cos \theta) - 1)]$ and $3/2 \tan \theta \sin \phi$ for the function generators can be replaced by somewhat less complicated approximations simply by replacing $\cos \phi$ and $(1/\cos \theta)$ with the more significant terms of a series expansion whereupon $$\cos \phi \approx 1 - (\phi^2/2)$$

$$1/(\cos \theta) \approx 1 + (\theta^2/2)$$

and function generators 14 and 16 are then required to implement equations of the form $$(3/2) [(\theta^2/2) - (\phi^2/2)] \text{ and } (\phi \theta) \text{ respectively.}$$

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a gyroscopic data transmission system including a gyroscope having a transmitter connected thereto and a receiver electrically coupled to the transmitter by way of a multicircuit line and wherein the transmitter and receiver have multiple branches each coupled to a respective branch of the multicircuit line, means for compensating the transmitter output signal for errors dependent upon the attitude of the gyroscope and the orientation of its gimbal configuration, said compensating means comprising first and second amplifiers having their inputs connected to one branch of said multicircuit line, said one branch of the multicircuit line being connected to a transmitter branch which is initially aligned with the spin axis of the gyroscope so as to provide zero voltage across a pair of other branches of the multicircuit line, means for modifying the signal provided by said first amplifier in accordance with a first function of the attitude of the gyroscope with respect to a pair of orthogonal axes, means for modifying the signal provided by said second amplifier in accordance with a second function of the attitude of the gyroscope with respect to said orthogonal axes, means for coupling the output of said first amplifier into said one branch of said multicircuit line, and means for coupling the output of said second amplifier into the other branches of said multicircuit line.

2. The apparatus of claim 1 wherein said first amplifier is serially coupled in said one branch and said means for coupling the output of said second amplifier into said other branches includes respective summing amplifiers each connected in a discrete branch of said multicircuit line for summing the signal thereon with the signal provided at the output of said second amplifier.

3. The apparatus of claim 1 wherein said means for coupling the output of said first amplifier into said one branch includes a transformer having a primary winding connected to the output of said first amplifier and a secondary winding serially connected in said one branch, and said means for coupling the output of said second amplifier into said other branches includes respective transformers each having a primary winding connecting to the output of said second amplifier and a secondary winding serially connected in a discrete branch of said other branches.

4. The apparatus of claim 1 wherein said first and second functions are representable mathematically as $3/2 [(\cos \phi/\cos \theta) - 1])$ and $\sqrt{3}/2 \tan \theta \sin \phi$ respectively where $\theta$ and $\phi$ represent the attitude of the gyroscope relative to respective ones of said orthogonal axes.

5. The apparatus of claim 1 wherein said first and second functions are representable mathematically as $3/2 [(\theta^2/2) - (\phi^2/2)]$ and $(\phi \theta)$ respectively where $\theta$ and $\phi$ represent the attitude of the gyroscope relative to respective ones of said orthogonal axes.

6. The apparatus of claim 1 including a resistor network connected in said multicircuit line intermediate the transmitter and receiver wherein the inputs of said first and second amplifiers are connected across the part of said network associated with said one branch.

7. The apparatus of claim 6 wherein the transmitter and receiver are respective synchros each having a relatively rotatable rotor and a three-branch stator, and said resistor network comprises Y-connected resistors coupled to the corresponding branches of the synchro stators.

8. The apparatus of claim 7 wherein said first and second functions are representable mathematically as $3/2 [(\cos \phi/\cos \theta) -1)]$ and $\sqrt{3}/2 \tan \theta \sin \phi$ respectively where $\theta$ and $\phi$ represent the attitude of the gyroscope relative to respective ones of said orthogonal axes.

9. The apparatus of claim 7 wherein said first and second functions are mathematically representable as $3/2 [(\theta^2/2) - (\phi^2/2)]$ and $(\phi \theta)$ respectively where $\theta$ and $\phi$ represent the attitude of the gyroscope relative to respective ones of said orthogonal axes.

10. The apparatus of claim 7 wherein said first amplifier has its input connected across one branch of said Y-connected resistors and its output coupled to a corresponding branch of said receiver, and the means for coupling the output of said second amplifier into said other branches includes respective summing amplifiers coupled between the corresponding branches of the stators of said transmitter and said receiver.

11. The apparatus of claim 7 wherein said means for coupling the output of said first amplifier into said one branch includes a transformer having a primary winding connected to the output of said first amplifier and a secondary winding serially connected in said one branch, and the means for coupling the output of said second amplifier into said other branches includes first and second additional transformers each having a primary winding connected to the output of said second amplifier and a secondary winding serially connected in a discrete branch of said other branches.

12. The apparatus of claim 7 wherein said gyroscope is a directional gyroscope oriented such that in a level condition its spin axis is in the plane of said orthogonal axes and its azimuth axis normal thereto, and further including additional gyroscopic means for providing signals representative of the attitude of said directional gyroscope relative to said orthogonal axes.

13. The apparatus of claim 12 wherein said first amplifier has its input connected across one branch of said Y-connected resistors and its output coupled to a corresponding branch of said receiver, and the means for coupling the output of said second amplifier into said other branches includes respective summing amplifiers coupled between the corresponding branches of the stators of said transmitter and said receiver.

14. The apparatus of claim 13 wherein the signals provided at the outputs of the respective summing amplifiers are phase inverted relative to one another.

15. The apparatus of claim 14 wherein said first and second functions are representable mathematically as $3/2 [(\cos \phi/\cos \theta) -1)]$ and $\sqrt{3}/2 \tan \theta \sin \phi$ respectively where $\theta$ and $\phi$ represent the attitude of the gyroscope relative to respective ones of said orthogonal axes.

16. The apparatus of claim 14 wherein said first and second functions are representable mathematically as $3/2 [(\theta^2/2) - (\phi^2/2)]$ and $(\phi \theta)$ respectively where $\theta$ and $\phi$ represent the attitude of the gyroscope relative to respective ones of said orthogonal axes.

17. The apparatus of claim 12 wherein said means for coupling the output of said first amplifier into said one branch includes a transformer having a primary winding connected to the output of said first amplifier and a secondary winding serially connected in said one branch, and the means for coupling the output of said second amplifier into the other branches includes first and second additional transformers each having a primary winding connected to the output of said second amplifier and a secondary winding serially connected in a discrete branch of said other branches.

18. The apparatus of claim 17 wherein the first and second additional transformers are connected so that the output signal of said second amplifier is applied to one of said other branches with phase opposite to that in the second of said other branches.

19. The apparatus of claim 18 wherein said first and second functions are representable mathematically as $3/2 [(\cos \phi/\cos \theta) -1)]$ and $\sqrt{3}/2 \tan \theta \sin \phi$ respectively where $\theta$ and $\phi$ represent the attitude of the gyroscope relative to respective ones of said orthogonal axes.

20. The apparatus of claim 18 wherein said first and second functions are representable mathematically as $3/2 [(\theta^2/2) - (\phi^2/2)]$ and $(\phi \theta)$ respectively where $\theta$ and $\phi$ represent the attitude of the gyroscope relative to respective ones of said orthogonal axes.

21. The apparatus of claim 1 wherein said multicircuit line comprises three branches and the signal applied from said second amplifier to one of said other branches is of opposite phase relative to the signal applied from said second amplifier to the second of said other branches.

22. The apparatus of claim 21 wherein said first and second functions are representable mathematically as $3/2 [(\cos \phi/\cos \theta) -1)]$ and $\sqrt{3}/2 \tan \theta \sin \phi$ respectively where $\theta$ and $\phi$ represent the attitude of the gyroscope relative to respective ones of said orthogonal axes.

23. The apparatus of claim 21 wherein said first and second functions are representable mathematically as $3/2 [(\theta^2/2) - (\phi^2/2)]$ and $(\phi \theta)$ respectively where $\theta$ and $\phi$ represent the attitude of the gyroscope relative to respective ones of said orthogonal axes.

* * * * *